US010353125B2

(12) United States Patent
Nam et al.

(10) Patent No.: US 10,353,125 B2
(45) Date of Patent: Jul. 16, 2019

(54) POLARIZING PLATE AND IMAGE DISPLAY DEVICE INCLUDING THE SAME

(71) Applicant: LG CHEM, LTD., Seoul (KR)

(72) Inventors: Sung-Hyun Nam, Daejeon (KR); Eun-Mi Seo, Daejeon (KR); Seung-Hee Nam, Daejeon (KR); Dae-Woong Lee, Daejeon (KR); Kyun-Il Rah, Daejeon (KR)

(73) Assignee: LG Chem, Ltd., Seoul (KR)

( * ) Notice: Subject to any disclaimer, the term of this patent is extended or adjusted under 35 U.S.C. 154(b) by 931 days.

(21) Appl. No.: 14/388,153

(22) PCT Filed: Jun. 18, 2014

(86) PCT No.: PCT/KR2014/005366
§ 371 (c)(1),
(2) Date: Sep. 25, 2014

(87) PCT Pub. No.: WO2014/204205
PCT Pub. Date: Dec. 24, 2014

(65) Prior Publication Data
US 2016/0062010 A1    Mar. 3, 2016

(30) Foreign Application Priority Data
Jun. 18, 2013 (KR) .................. 10-2013-0069631
Jun. 17, 2014 (KR) .................. 10-2014-0073329

(51) Int. Cl.
G02B 5/30    (2006.01)
G02F 1/1335  (2006.01)
C09J 163/00  (2006.01)
C09J 163/10  (2006.01)
C08G 59/18   (2006.01)
C08G 59/20   (2006.01)
C08G 59/22   (2006.01)

(52) U.S. Cl.
CPC ............ G02B 5/305 (2013.01); C09J 163/00 (2013.01); G02F 1/133528 (2013.01);
(Continued)

(58) Field of Classification Search
CPC ............ G02F 1/133528; G02F 2202/28; C09J 163/00; C09J 163/10; C08G 59/18;
(Continued)

(56) References Cited

U.S. PATENT DOCUMENTS 6,368,699 B1 *  4/2002  Gilbert .................. B32B 27/36
                                                       428/212
2010/0220266 A1  9/2010  Kashima et al.
(Continued)

FOREIGN PATENT DOCUMENTS

CN    101799564 A    8/2010
JP    2009-169447 A  7/2009
(Continued)

Primary Examiner — Eli D. Strah
(74) Attorney, Agent, or Firm — Dentons US LLP

(57) ABSTRACT

The present disclosure relates to a polarizing plate including an adhesive layer, a primer layer and a polyethylene terephthalate film which are sequentially formed on at least one side of a polarizer, wherein the adhesive layer in the present disclosure is formed by an active energy ray-curable adhesive including a first epoxy compound of which a homopolymer has a glass transition temperature of 120° C. or higher, a second epoxy compound of which a homopolymer has a glass transition temperature of 60° C. or lower, and a cationic photopolymerization initiator, and wherein the primer layer is formed by a primer composition including one or more binder resins selected from the group consisting of polyester and polyvinyl alcohol-based resins, and one or more cross-linking agents selected from the group consisting of acrylic cross-linking agents, epoxy-based cross-linking agents and polyvinyl alcohol-based cross-linking agents.

21 Claims, 4 Drawing Sheets

(52) U.S. Cl.
CPC ... *B32B 2457/202* (2013.01); *B32B 2457/206* (2013.01); *C08G 59/18* (2013.01); *C08G 59/20* (2013.01); *C08G 59/22* (2013.01); *C08G 59/226* (2013.01); *C09J 163/10* (2013.01); *G02F 2202/28* (2013.01); *Y10T 428/1073* (2015.01); *Y10T 428/31515* (2015.04)

(58) Field of Classification Search
CPC ...... C08G 59/20; C08G 59/22; C08G 59/226; Y10T 428/31515; Y10T 428/1073; G02B 5/305; B32B 2457/202; B32B 2457/206
See application file for complete search history.

(56) References Cited

U.S. PATENT DOCUMENTS

2011/0103036 A1\* 5/2011 Bosl ..................... G02B 5/3033
362/19

2012/0281279 A1\* 11/2012 Goto ..................... B29C 55/023
359/487.02

2014/0072731 A1 3/2014 Sea et al.

FOREIGN PATENT DOCUMENTS

| | | |
|---|---|---|
| JP | 2010-054737 A | 3/2010 |
| JP | 2010-237623 A | 10/2010 |
| JP | 2010-266658 A | 11/2010 |
| JP | 2012-203211 A | 10/2012 |
| JP | 2013-33085 A | 2/2013 |
| KR | 10-2010-0068178 A | 6/2010 |
| KR | 10-2010-0089779 A | 8/2010 |
| KR | 10-2010-0123624 A | 11/2010 |
| KR | 10-2011-0075998 A | 7/2011 |
| KR | 10-2013-0019001 A | 2/2013 |
| KR | 10-2013-0035353 A | 4/2013 |
| KR | 10-2013-0040725 A | 4/2013 |
| WO | 2013055158 A2 | 4/2013 |
| WO | WO 2013055158 A2 \* | 4/2013 ............. C09J 63/00 |

\* cited by examiner

[Fig. 1]
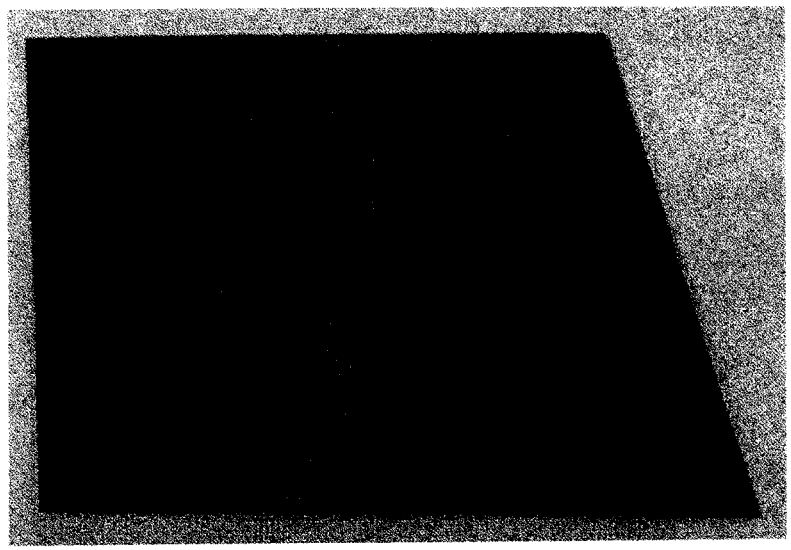
[Fig. 2]
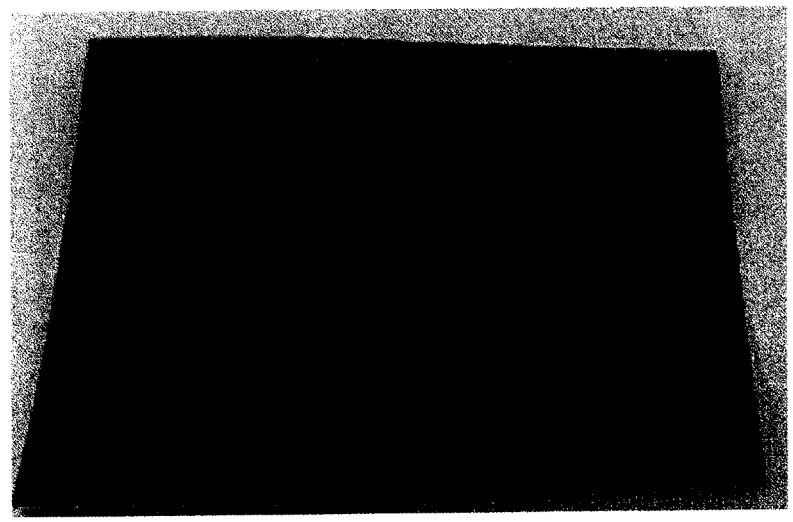

[Fig. 3]
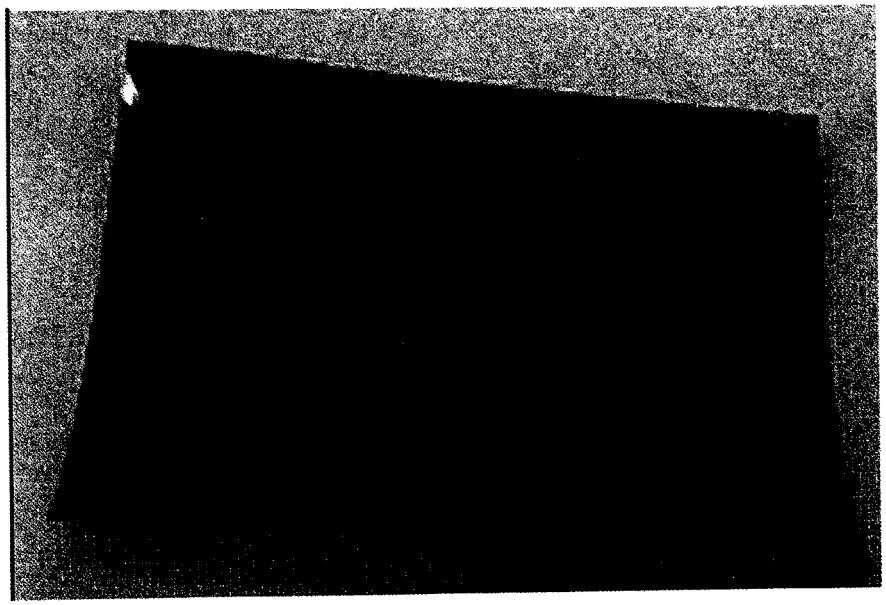
[Fig. 4]
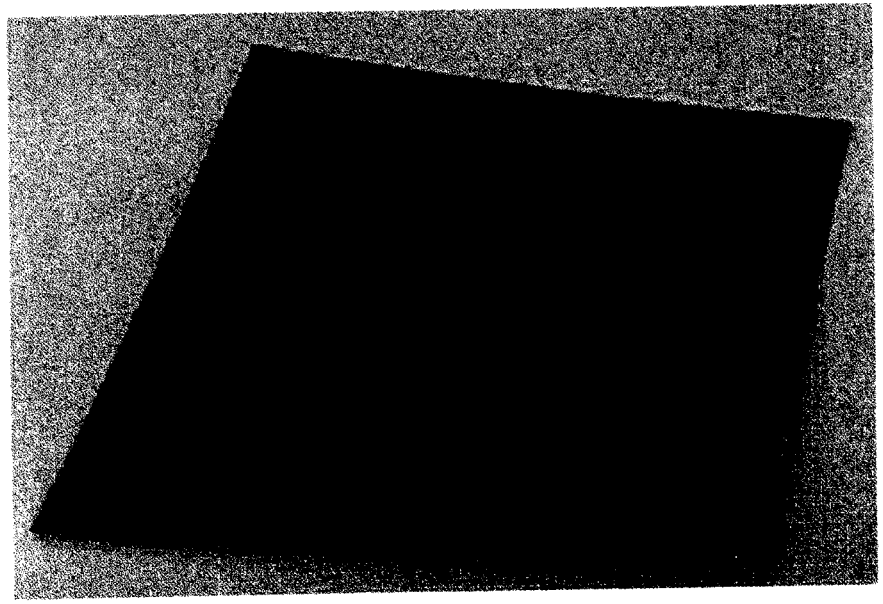

[Fig. 5]
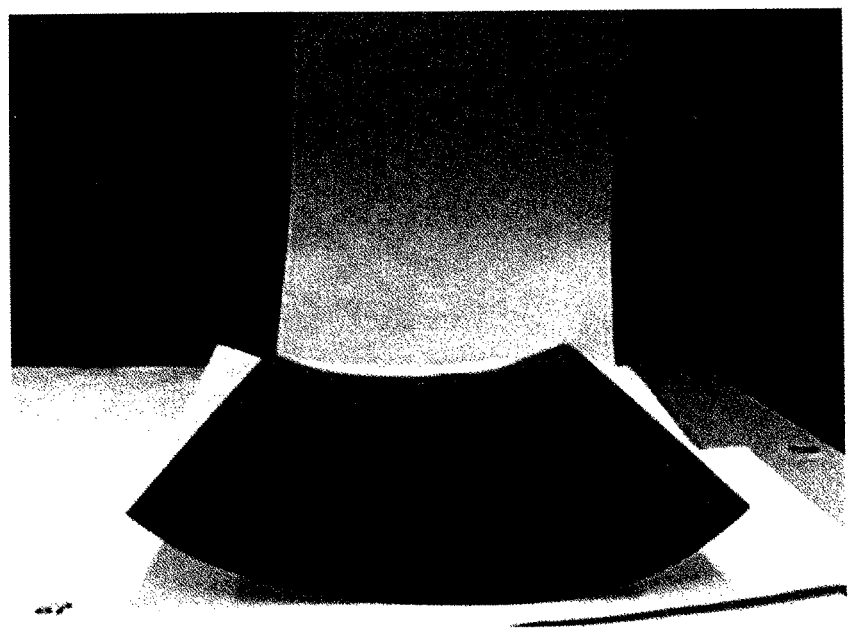
[Fig. 6]
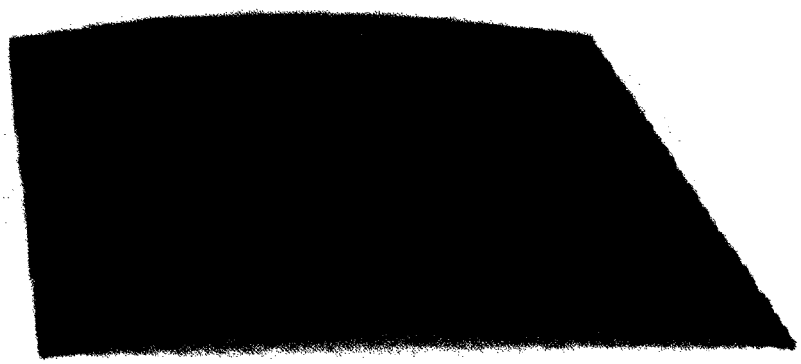

[Fig. 7]
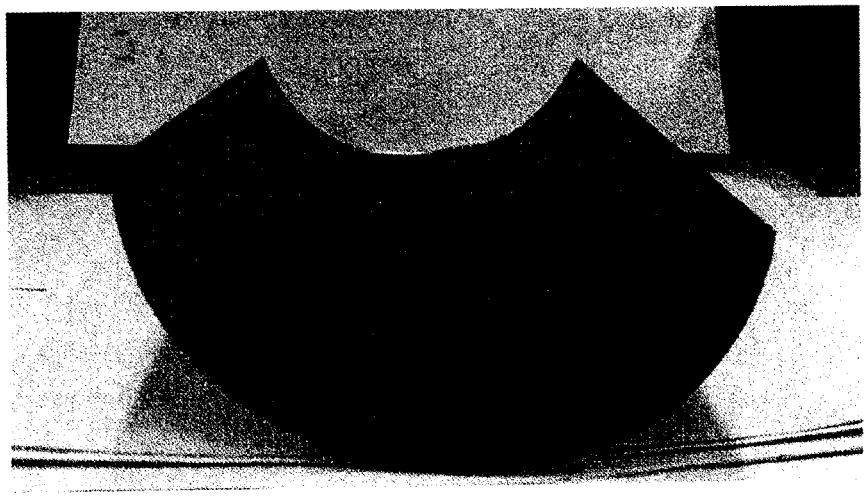
[Fig. 8]
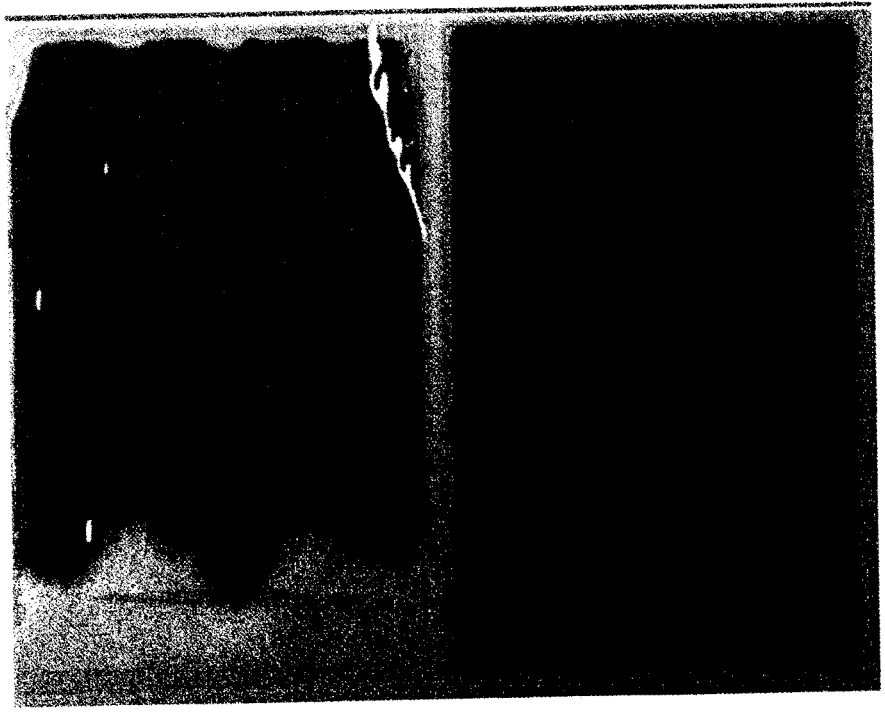
Comparative Example 1　　　Example 1

POLARIZING PLATE AND IMAGE DISPLAY DEVICE INCLUDING THE SAME

This application is a National Stage application of PCT/KR2014/005366, filed on Jun. 18, 2014, which claims priority to Korean Patent Application Nos. 10-2013-0069631, filed on Jun. 18, 2013, and 10-2014-0073329 filed on Jun. 17, 2014, all of which are hereby incorporated by reference in their entirety.

TECHNICAL FIELD

The present disclosure relates to a polarizing plate and an image display device including the same, and more particularly, to a polarizing plate having a polyethylene terephthalate film as a protective film formed on one side of a polarizer and an image display device including the same.

BACKGROUND ART

Due to the characteristics of Liquid Crystal Displays (LCDs) such as low power consumption, low voltage operation, lightweight, and thinness, LCDs have recently been used in various display devices. Such LCDs are composed of a variety of materials, including liquid crystal cells, polarizing plates, retardation films, condensing sheets, diffusion sheets, light guide plates, and light reflecting sheets. Therefore, improvements have been actively been made to obtain advancement in productivity, weight reductions, and brightening of the LCDs by reducing the number of films included in the LCDs or decreasing thicknesses of the films or sheets included in the LCDs.

Polarizing plates have been used in structures in which protective films are laminated using adhesives on one side or both sides of polarizers formed of polyvinyl alcohol (hereinafter, referred to as 'PVA')-based resins usually dyed with dichroic dyes or iodine. Although triacetyl cellulose (TAC)-based films as polarizing plate protective films have been mainly used, there have been problems that the TAC films were easily deformed at high temperature and high humidity conditions. Therefore, protective films formed of various materials that are capable of replacing the TAC films have recently been developed. For example, methods of using polyethylene terephthalate (PET), cycloolefin polymer (COP), acrylic films, or mixtures thereof as the protective films have been suggested.

Studies have been actively made into a technology of using polyethylene terephthalate (PET) as the protective films among the above-detailed methods, since polyethylene terephthalate (PET) films are inexpensive and have excellent transparency.

A water-based adhesive layer formed between a polarizer and a polyethylene terephthalate (PET) film, and polarizing plates between which the adhesive layer is interposed are disclosed in Korean Patent Publication Nos. 2011-0075998, 2010-0068178, etc. However, since water-based adhesives are used in previous technologies, there is a problem that durability is deteriorated due to insufficient adhesive strength between the polarizer and the polyethylene terephthalate (PET) film. Further, it is general that polyethylene terephthalate is used on one side of the polarizing plate, and other types of polymer films having excellent optical properties or characteristics such as permeability and so on are used on the other side of the polarizing plate when manufacturing a polarizing plate since the polyethylene terephthalate (PET) film has low permeability or optical properties even though being inexpensive. However, when a water-based adhesive is used as an adhesive in a polarizing plate using different types of polymer films on both sides of the polarizer, there are problems that a dry efficiency difference is generated by a difference in water permeability between a polyethylene terephthalate film and a polymer film that is different from the polyethylene terephthalate film in the drying process for hardening the adhesive, and curling of the polarizing plate is intensified consequently. If curling is generated in the polarizing plate, there may be problems that it is difficult to adhere to the polarizing plate in a lamination process of adhering the polarizing plate to an image display device, and a defect ratio may be increased due to the inflow of foreign objects. Further, even after adhering the polarizing plate to the image display device, a defective contact with a liquid crystal panel or a bending phenomenon of the liquid crystal panel is easily generated by curling of the polarizing plate. Accordingly, since a large amount of strain may be formed while a contact of the display device module with a module case is occurring when the image display device is mounted on a display device module, light leakage or unevenness may be generated, causing image defects.

Therefore, it is necessary to develop polarizing plates which are excellent in terms of optical properties and curling characteristics while using polyethylene terephthalate films as protective films.

DISCLOSURE

Technical Problem

In order to solve the above-described problems, an aspect of the present disclosure may provide polarizing plates in which excellent curl characteristics and optical properties are realized while using polyethylene terephthalate films.

Technical Solution

According to an aspect of the present disclosure, a polarizing plate may include an adhesive layer, a primer layer, and a polyethylene terephthalate film which are sequentially formed on at least one side of a polarizer, wherein the adhesive layer is formed by an active energy ray-curable adhesive including a first epoxy compound of which a homopolymer has a glass transition temperature of 120° C. or higher, a second epoxy compound of which a homopolymer has a glass transition temperature of 60° C. or lower, and a cationic photopolymerization initiator, wherein the primer layer is formed by a primer composition including one or more binder resins selected from the group consisting of polyester and polyvinyl alcohol-based resins, and one or more cross-linking agents selected from the group consisting of acrylic cross-linking agents, epoxy-based cross-linking agents and polyvinyl alcohol-based cross-linking agents.

The active energy ray-curable adhesive may include 100 parts by weight of the first epoxy compound of which a homopolymer has a glass transition temperature of 120° C. or higher, 30 parts by weight to 100 parts by weight of the second epoxy compound of which a homopolymer has a glass transition temperature of 60° C. or lower, and 0.5 parts by weight to 20 parts by weight of the cationic photopolymerization initiator.

Further, the polarizing plate may include a transparent polymer film which is formed on the other side of the polarizer and selected from the group consisting of a triacetyl cellulose film, a cycloolefin polymer film, a polyester-based film, a polycarbonate film, and an acrylic film.

According to another aspect of the present disclosure, an image display device may include the above-described polarizing plate of the present disclosure.

Advantageous Effects

A polarizing plate according to the present disclosure has minimized curling and is excellent in terms of optical properties and durability even when using a polyethylene terephthalate film together with a polymer film that is different from the polyethylene terephthalate film.

Further, a polarizing plate of the present disclosure includes a primer layer interposed between a polyethylene terephthalate film and an adhesive layer and formed of a specific primer composition such that the polarizing plate may maintain durability even under severe conditions such as those of high temperature and high humidity by improving adhesive strength between the polyethylene terephthalate film and the adhesive layer.

DESCRIPTION OF DRAWINGS

FIGS. 1 to 7 are photographs illustrating curl characteristics of polarizing plates manufactured as Example 1 and Comparative Examples 1 to 6; and FIG. 8 is photographs illustrating the states of polarizing plates obtained after dipping the polarizing plates manufactured by Example 1 and Comparative Example 1 into water of 60° C. for 24 hours.

BEST MODE

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

A polarizing plate according to the present disclosure includes an adhesive layer, a primer layer and a polyethylene terephthalate film sequentially formed on at least one side of a polarizer, wherein the adhesive layer is formed by an active energy ray-curable adhesive including a first epoxy compound of which a homopolymer has a glass transition temperature of 120° C. or higher, a second epoxy compound of which a homopolymer has a glass transition temperature of 60° C. or lower, and a cationic photopolymerization initiator, and wherein the primer layer is formed by a primer composition including one or more binder resins selected from the group consisting of polyester and polyvinyl alcohol-based resins, and one or more cross-linking agents selected from the group consisting of acrylic cross-linking agents, epoxy-based cross-linking agents and polyvinyl alcohol-based cross-linking agents.

Hereinafter, components of the present disclosure will be described more in detail.

(1) Polarizer

Examples of the polarizer usable in the present disclosure are not particularly limited, but may include polarizers that are generally used in the related art such as polyene-based oriented films treated with a dehydrating material of polyvinyl alcohol or a dehydrochlorinating material of polyvinyl chloride, and films which are oriented in predetermined directions obtained by stretching the polarizing material-adsorbed films after the adsorbing of a polarizing material such as iodine or a dichroic dye onto hydrophilic polymer films such as polyvinyl alcohol-based films, partially formalized polyvinyl alcohol-based films, and partially saponified ethylene/vinyl acetate copolymer films. The polarizers may be polyvinyl alcohol-based polarizers in which molecular chains containing an iodine-based compound or a dichroic polarizing material are oriented in a predetermined direction.

On the other hand, the polyvinyl alcohol-based polarizers can be manufactured by polyvinyl alcohol-based polarizer manufacturing methods well known in the related art, and the polyvinyl alcohol-based polarizer manufacturing methods are not particularly limited. For example, polarizers usable in the present disclosure can be manufactured by impregnating non-stretched polyvinyl alcohol-based films with iodine and/or an aqueous dichroic dye solution to dye the non-stretched polyvinyl alcohol-based films, and cross-linking and stretching the dyed non-stretched polyvinyl alcohol-based films. The polarizers usable in the present disclosure can be manufactured by coating polyvinyl alcohol-based resins on a polymer substrate film, or laminating or adhering polyvinyl alcohol-based films to the polymer substrate film to form film laminates, impregnating the film laminates with iodine and/or an aqueous dichroic dye solution to dye the film laminates, cross-linking and stretching the dyed film laminates, and separating the cross-linked and stretched dyed film laminates from the polymer substrate film.

Further, commercially available products may be used as the polyvinyl alcohol-based polarizers.

As a matter of convenience in the present specification, the term 'polarizer' refers to a state in which a transparent polymer film is not attached to the polarizer, and the term 'polarizing plate' refers to a state in which the transparent polymer film is attached to the polarizer.

(2) Protective Film

In the present disclosure, a polyethylene terephthalate film is adhered to at least one side of the polarizer by means of an adhesive layer and a primer layer. The polyethylene terephthalate film not only improves water resistance of a polarizing plate when it is used as a polarizer protective film due to a low water vapor transmission rate and moisture content thereof, but also maintains excellent optical properties of the polarizing plate even under high temperature and high humidity conditions due to a high resistance to heat and water thereof. Further, the polyethylene terephthalate film has a merit of lowering a manufacturing cost of the polarizing plate when using the polyethylene terephthalate film since it has an inexpensive production cost as compared to other transparent polymer films.

On the other hand, the polyethylene terephthalate film usable in the present disclosure refers to a film formed by a polyethylene terephthalate-based resin, wherein the polyethylene terephthalate-based resin refers to a resin in which 50% by mole of the total repeating unit is an ethylene terephthalate unit, and the polyethylene terephthalate-based resin may include a film manufactured by a resin including units derived from other copolymer constituents besides the ethylene terephthalate unit. The other copolymer constituents may include: dicarboxylic acid constituents, e.g., isophthalic acid, p-β-oxyethoxybenzoic acid, 4,4'-dicarboxydiphenyl, 4,4'-dicarboxybenzophenone, bis(4-carboxyphenyl)ethane, adipic acid, sebacic acid, 5-sulfoisophthalic acid sodium and 1,4-dicarboxycyclohexane; and diol constituents e.g., propylene glycol, butanediol, neopentyl glycol, diethylene glycol, cyclohexanediol, bisphenol A-ethyleneoxide adduct, polyethylene glycol, polypropylene glycol and polytetramethylene glycol. According to the need, two or more of the dicarboxylic acid constituents or the diol constituents may be used in combinations. Further, oxycarboxylic acids, e.g., p-oxybenzoic acid may be used together with the dicarboxylic acid constituents or the diol constituents. The other copolymer constituents may also include dicarboxylic acid constituents and/or diol constituents containing small amounts of an amide bond, a urethane bond, an ether bond, and a carbonate bond.

The polyethylene terephthalate film used in the present disclosure can be manufactured according to polyethylene terephthalate film-manufacturing methods well known in the related art, and commercially available polyethylene terephthalate films may be used.

Meanwhile, the polyethylene terephthalate film usable in the present disclosure is not limited to commercially available polyethylene terephthalate films. For example, the polyethylene terephthalate film usable in the present disclosure may have a water vapor transmission rate of 100 g/m$^2$·day or less, preferably about 10 g/m$^2$·day to about 50 g/m$^2$·day and may have a moisture content of 1% by weight or less, preferably about 0.1% by weight to about 0.6% by weight since improvement effects of both water resistance and durability under high temperature and high humidity conditions are exhibited better when the water vapor transmission rate and the moisture content satisfy the numerical values.

Further, the polyethylene terephthalate film usable in the present disclosure is not limited to the above-described film, but it may be a film on at least one side of which a low refractive index layer formed of a material having a refractive index of about 1.4 to about 1.5 is formed. In general, since a polyethylene terephthalate film has a relatively high refractive index of about 1.65 compared to those of a TAC film and other films such that light reflection is increased on the surface of the protective film when the polyethylene terephthalate film is applied as a polarizing plate protective film, a polarizing plate using the polyethylene terephthalate film has generally tended to have a decrease of about 1% in single transmittance compared to a polarizing plate using the TAC film. However, according to research undertaken by the present inventors, a reduction in single transmittance of the polarizing plate can be prevented after manufacturing a polarizing plate when using a polyethylene terephthalate film on which a low refractive index layer is formed.

The low refractive index layer may be formed on one side or both sides of the polyethylene terephthalate film, and may be formed on a side of the polyethylene terephthalate film opposite to the side of the polyethylene terephthalate film on which the primer layer is formed.

Further, the low refractive index layer may be formed by a resin composition in which a polymer resin is mixed with a low refractive index material having a low refractive index, wherein examples of the polymer resin may include acrylic resins, and examples of the low refractive index material may include silica-based compounds, and fluorine-based compounds, e.g., 1,1,1-trifluoroethane, polyvinylidene fluoride (PVDF), polytetrafluoroethylene (PTFE, Tefron), hydrofluoroether, hydrochlorofluorocarbon, hydrofluorocarbon, perfluorocarbon, perfluoropolyether, perfluorooctanoic acid (PFOA), perfluorooctane sulfonate (PFOS) and perfluoroalkoxy fluoropolymer.

Meanwhile, the polyethylene terephthalate film has a total refractive index of about 1.48 to about 1.55, preferably about 1.50 to about 1.53. The total refractive index refers to an effective refractive index of a polyethylene terephthalate film including other functional coating layer as well as a refractive index of a single polyethylene terephthalate film. For example, effective refractive indexes of the polyethylene terephthalate film and the low refractive index layer that is a functional coating layer are a total refractive index. When the total refractive index of the polyethylene terephthalate film satisfies the range, a refractive index difference between laminated films is reduced such that Fresnel reflection between respective layers is lowered to prevent a drop in single transmittance of the polarizing plate, and to minimize a rainbow phenomenon due to an interference effect caused by the high refractive index of the polyethylene terephthalate film itself.

On the other hand, in a polarizing plate according to the present disclosure, a polyethylene terephthalate film may be adhered to both sides of a polarizer, and the polyethylene terephthalate film may be adhered to one side of the polarizer while a transparent polymer film besides the polyethylene terephthalate film may be adhered to the other side of the polarizer. The transparent polymer film adhered to the other side of the polarizer is a polarizer protective film or a compensation film for compensating optical characteristics of the polarizer, materials of the transparent polymer film are not particularly limited, and polymer films known in the related art may be used as the transparent polymer film. More specifically, although the transparent polymer film is not limited to the polymer films, the transparent polymer film adhered to the other side of the polarizer may be selected from the group consisting of a triacetyl cellulose film, a cycloolefin polymer film, a polyester-based film, a polycarbonate film, and an acrylic film. Meanwhile, the transparent polymer film adhered to the other side of the polarizer may optically have an isotropic property or an anisotropic property. For example, the transparent polymer film adhered to the other side of the polarizer may have a phase difference value that can offset optical anisotropy properties of the polyethylene terephthalate film or may have an appropriate phase difference value that can compensate viewing angle characteristics of an LCD applied in a combination with the polyethylene terephthalate film.

On the other hand, if necessary, a surface treatment process for improving adhesive strength may be performed on the polyethylene terephthalate film and the transparent polymer film. For example, at least one surface treatment process selected from the group consisting of an alkali treatment process, a corona treatment process, and a plasma treatment process may be performed on at least one side of the optical film.

(3) Adhesive Layer

Meanwhile, the polarizer and the polyethylene terephthalate film according to the present disclosure are adhered by an active energy ray-curable adhesive, wherein the active energy ray-curable adhesive refers to an adhesive cured by radiation of active energy rays.

An active energy ray-curable adhesive usable in the present disclosure may include (1) a first epoxy compound of which a homopolymer has a glass transition temperature of 120° C. or higher, (2) a second epoxy compound of which a homopolymer has a glass transition temperature of 60° C. or lower, and (3) a cationic photopolymerization initiator.

More specifically, the active energy ray-curable adhesive may preferably include (1) 100 parts by weight of the first epoxy compound of which a homopolymer has a glass transition temperature of 120° C. or higher, (2) 30 parts by weight to 100 parts by weight of the second epoxy compound of which a homopolymer has a glass transition temperature of 60° C. or lower, and (3) 0.5 parts by weight to 20 parts by weight of the cationic photopolymerization initiator.

It is advantageous, in terms of thermal shock properties, that two or more types of epoxy compounds having different glass transition temperatures are used as described above, since a homopolymer having a low glass transition temperature plays an advantageous role in terms of adhesive strength and viscosity, and since the glass transition temperature is not lowered when the homopolymer having a low glass transition temperature is used together with a homopolymer having a high glass transition temperature.

Epoxy compounds in the present specification refer to compounds having one or more epoxy groups in molecules, the epoxy compounds are preferably compounds having two or more epoxy groups in the molecules, and the epoxy compounds may include monomers, polymers, and resin type compounds. The epoxy compounds according to the present invention may be resin type compounds.

The first epoxy compound can be used without particular limitations if the first epoxy compound is an epoxy compound of which a homopolymer has a glass transition temperature of 120° C. or higher. For example, an alicyclic epoxy compound and/or an aromatic epoxy compound of which a homopolymer has a glass transition temperature of 120° C. or higher may be used as the first epoxy compound according to the present disclosure. Specific examples of the epoxy compound or the epoxy compounds of which a homopolymer has a glass transition temperature of 120° C. or higher may include 3,4-epoxycyclohexylmethyl-3,4'-epoxycyclohexanecarboxylate, vinyl cyclohexane dioxide, dicyclopentadiene dioxide, bis(epoxycyclopentyl)ether, bisphenol A-based epoxy compounds, and bisphenol F-based epoxy compounds. On the other hand, it is more preferable that the homopolymer of the first epoxy compound has a glass transition temperature of about 120° C. to about 200° C. Next, the second epoxy compound may be used without particular limitations if the second epoxy compound is an epoxy compound of which a homopolymer has a glass transition temperature of 60° C. or lower. Examples of the second epoxy compound may include alicyclic epoxy compounds, aromatic epoxy compounds, etc.

The alicyclic epoxy compounds may include bifunctional epoxy compounds, i.e., compounds having two epoxy groups preferably, and may include compounds in which two epoxy groups are all alicyclic epoxy groups more preferably. However, the alicyclic epoxy compounds are not limited thereto.

The aromatic epoxy compounds may be epoxy compounds that do not have alicyclic epoxy groups, but have aromatic epoxy groups. Examples of the aromatic epoxy compounds may include: a polyglycidyl ether of an aliphatic polyvalent alcohol; a polyglycidyl ether of an aliphatic polyvalent alcohol-alkyleneoxide adduct; a polyglycidyl ether of an aliphatic polyvalent alcohol and aliphatic polyvalent carboxylic acid-polyester polyol; a polyglycidyl ether of an aliphatic polyvalent carboxylic acid; a polyglycidyl ether of a polyester polycarboxylic acid of aliphatic polyvalent alcohol and aliphatic polyvalent carboxylic acid; dimmers, oligomers or polymers obtained by vinyl polymerization of glycidyl acrylate or glycidyl methacrylate; and oligomers or polymers obtained by vinyl polymerization of glycidyl acrylate, glycidyl methacrylate, and other vinyl-based monomers. The examples of the aromatic epoxy compounds may include a polyglycidyl ether of an aliphatic polyvalent alcohol or aliphatic polyvalent alcohol alkyleneoxide adduct, but the aromatic epoxy compounds are not limited to the examples.

Examples of the aliphatic polyvalent alcohol are C2-C20, C2-C16, C2-C12, C-C8 or C2-C4 aliphatic polyvalent alcohols and may include: aliphatic diols, e.g., ethylene glycol, 1,2-propanediol, 1,3-propanediol, 2-methyl-1,3-propanediol, 2-butyl-e-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol; alicyclic diols, e.g., cyclohexanedimethanol, cyclohexanediol, hydrogen-added bisphenol A, and hydrogen-added bisphenol F; trimethylolethane; trimethylolpropane; hexitols; pentitols; glycerine; polyglycerine; pentaerythritol; dipentaerythritol; and tetramethylolpropane.

Further, examples of the alkyleneoxide are C2-C20, C2-C16, C2-C12, C-C8 or C2-C4 alkyleneoxides and may include ethylene oxide, propylene oxide, butylenes oxide, etc.

Further, although examples of the aliphatic polyvalent carboxylic acid may include oxalic acid, malonic acid, succinic acid, glutaric acid, adipic acid, pimelic acid, suberic acid, azelaic acid, sebacic acid, dodecanedioic acid, 2-methyl succinate, 2-methyladipate, 3-methylpentanedioic acid, 2-methyloctanedioic acid, 3,8-dimethyldecanedioic acid, 3,7-dimethyldecanedioic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,3-cyclohexanedicarboxylic acid, 1,4-dicarboxylmethylenecyclohexane, 1,2,3-propanetricarboxylic acid, 1,2,3,4-butanetetracarboxylic acid and 1,2,3,4-cyclobutanetetracarboxylic acid, the aliphatic polyvalent carboxylic acid is not limited to the examples.

A second epoxy compound according to the present disclosure includes one or more of glycidyl ether groups. For example, the second epoxy compound according to the present disclosure may include one or more selected from the group consisting of 1,4-cyclohexanedimethanoldiglycidyl ether, 1,4-butanedioldiglycidyl ether, 1,6-hexanedioldiglycidyl ether, neopentyldiglycidyl ether, resorcinol diglycidyl ether, diethylene glycol diglycidyl ether, ethylene glycol diglycidyl ether, trimethylolpropane triglycidyl ether, n-butyl glycidyl ether, 2-ethylhexyl glycidyl ether, phenyl glycidyl ether, and o-cresyl glycidyl ether.

Meanwhile, it is more preferable that the homopolymer of the second epoxy compound has a glass transition temperature of about 0° C. to about 60° C.

On the other hand, although the epoxy compound is not limited thereto, examples of an epoxy compound according to the present disclosure may include a combination of a first epoxy compound including one or more epoxidized alicyclic groups and a second epoxy compound including one or more glycidyl ether groups. Using the first epoxy compound and the second epoxy compound in combination as described above not only satisfies low viscosity and adhesive strength, but also improves thermal shock properties of a polarizing plate.

Meanwhile, the second epoxy compound is preferably contained in an amount of 30 parts by weight to 100 parts by weight with respect to 100 parts by weight of the first epoxy compound since a glass transition temperature of the total adhesive composition may be lowered to deteriorate heat resistance when the second epoxy compound is contained in an amount greater than 100 parts by weight, and adhesive strength may be deteriorated when the second epoxy compound is contained in an amount of less than 30 parts by weight.

An active energy ray-curable adhesive may be used by mixing the first epoxy compound with the second epoxy compound at a weight ratio of preferably about 1:1 to about 3:1, more preferably 1:1 to 2:1, and most preferably 1:1. When the first and second epoxy compounds satisfy the weight ratio range, the most desirable physical properties in terms of glass transition temperature and adhesive strength may be obtained.

On the other hand, the cationic photopolymerization initiator is compounds producing cationic species and Lewis acids by radiation of active energy rays. Although examples of the cationic photopolymerization initiator may include aromatic diazonium salts, onium salts such as aromatic iodine aluminum salt and aromatic sulfonium salt, and iron-arene complexes, the cationic photopolymerization initiator is not limited to the examples. Meanwhile, the cationic photopolymerization initiator is contained in an amount of about 0.5 parts by weight to about 20 parts by weight, preferably about 0.5 parts by weight to about 15 parts by weight, and more preferably about 0.5 parts by weight to about 10 parts by weight with respect to 100 parts by weight of the first epoxy compound.

On the other hand, if necessary, the active energy ray-curable adhesive may additionally include 100 parts by weight to 400 parts by weight of an oxetane compound having at least one oxetanyl group within molecules thereof. When the oxetane compound is used, the oxetane compound lowers viscosity of the adhesive such that a thin film of an adhesive layer may be formed.

If the oxetane compound is an oxetane compound having at least one oxetanyl group within molecules thereof, the oxetane compound is not particularly limited, and various oxetane compounds well known in the related art may be used as the oxetane compound. Examples of an oxetane compound according to the present disclosure may include 3-ethyl-3-[(3-ethyloxetane-3-il)methoxymethyl]oxetane, 1,4-bis[(3-ethyloxetane-3-il)methoxymethyl]benzene, 1,4-bis[(3-ethyloxetane-3-il)methoxy]benzene, 1,3-bis[(3-ethyloxetane-3-il)methoxy]benzene, 1,2-bis[(3-ethyloxetane-3-il)methoxy]benzene, 4,4'-bis[(3-ethyloxetane-3-il)methoxy]biphenyl, 2,2'-bis[(3-ethyloxetane-3-il)methoxy]biphenyl, 3,3',5,5'-tetramethyl-4,4'-bis[(3-ethyloxetane-3-il)methoxy]biphenyl, 2,7-bis[(3-ethyloxetane-3-il)methoxy]naphthalene, bis[4-{(3-ethyloxetane-3-il)methoxy}phenyl]methane, bis[2-{(3-ethyloxetane-3-il)methoxy}phenyl]methane, 2,2-bis[4-{(3-ethyloxetane-3-il)methoxy}phenyl]propane, esterification-modified products by 3-chloromethyl-3-ethyloxetane of novolac type phenol-formaldehyde resin, 3(4),8(9)-bis[(3-ethyloxetane-3-il)methoxymethyl]-tricyclo[5.2.1.0 2,6]decane, 2,3-bis[(3-ethyloxetane-3-il)methoxymethyl]norbonane, 1,1,1-tris[(3-ethyloxetane-3-il)methoxymethyl]propane, 1-butoxy-2,2-bis[(3-ethyloxetane-3-il)methoxymethyl]butane, 1,2-bis[{2-(3-ethyloxetane-3-il)methoxy}ethylthio]ethane, bis[{4-(3-ethyloxetane-3-il)methylthio}phenyl]sulfide, and 1,6-bis[(3-ethyloxetane-3-il)methoxy]-2,2,3,3,4,4,5,5-octafluorohexane. Meanwhile, the oxetane compound is contained in an amount of preferably about 100 parts by weight to about 400 parts by weight, more preferably about 150 parts by weight to about 300 parts by weight with respect to 100 parts by weight of the first epoxy compound.

An oxetane compound having two oxetanyl groups is effective in increasing a glass transition temperature of the adhesive layer, and an oxetane compound having one oxetanyl group is advantageous in adhesive strength.

On the other hand, if necessary, the active energy ray-curable adhesive may additionally include a vinyl-based compound along with the above-mentioned constituents. When the vinyl-based compound is added in the active energy ray-curable adhesive, the active energy ray-curable adhesive may maintain a low viscosity and reduce a phenomenon in which a glass transition temperature of the adhesive layer is lowered after curing the active energy ray-curable adhesive.

Examples of the vinyl-based compound may include hydroxy C1-6 alkylvinylether and/or vinyl acetate, wherein the hydroxy C1-6 alkylvinylether may be at least one selected from the group consisting of hydroxyethyl vinyl ether, hydroxybutyl vinyl ether, 1,4-cyclohexanedimethanol vinyl ether, 4-(hydroxymethyl)cyclohexylmethyl vinyl ether, ethyleneglycol vinyl ether, and diethylene glycol monovinyl ether.

Meanwhile, the vinyl-based compound may be contained at a ratio of 0.1 parts by weight to 10 parts by weight or 0.1 parts by weight to 5 parts by weight with respect to 100 parts by weight of the total adhesive composition.

Further, an adhesive composition for polarizing plates according to the present disclosure may additionally include a silane coupling agent along with the above-described constituents if necessary. If the adhesive composition for polarizing plates includes the silane coupling agent, the silane coupling agent lowers surface energy of an adhesive to obtain an effect of improving wetting properties of the adhesive.

Examples of the silane coupling agent may be silane coupling agents including cationic polymerizable functional groups, e.g., an epoxy group, a vinyl group, and a radical group. The present inventors found out that wetting properties of the adhesive could be improved without deteriorating a glass transition temperature of the adhesive when using the silane coupling agent including the cationic polymerizable functional groups differently from when using a silane coupling agent that did not include surfactants or cationic polymerizable functional groups. This is thought to be so since the cationic polymerizable functional groups of the silane coupling agent reduce a phenomenon in which the glass transition temperature of the adhesive layer is lowered after curing while the cationic polymerizable functional groups of the silane coupling agent are formed in a cross-linked form as they are reacted with silane groups of the adhesive composition.

Although the silane coupling agent usable in the present disclosure is not limited thereto, the silane coupling agent may be silane coupling agents represented by the following Formula 1:

$$Si(R_1)_n(R_2)_{4-n}$$ [Formula 1]

where $R_1$ as cationic polymerizable functional group bonded to silicon atom is a functional group including a cyclic ether group or a vinyloxy group, $R_2$ is hydrogen, a hydroxyl group, an alkyl group or an alkoxy group bonded to silicon atom, and n is an integer of 1 to 4.

Specific examples of a silane coupling agent satisfying the Formula 1 may include 2-(3,4-epoxycyclohexyl)ethyl trimethoxy silane, 3-glycidoxypropyl trimethoxy silane, glycidoxypropyl methyldiethoxy silane, glycidoxypropyl triethoxy, vinyltrimethoxysilane, vinyltriethoxysilane, etc. However, the silane coupling agent is not limited thereto.

Oligomer type silane compounds in which the cationic polymerizable functional groups are introduced into molecules of siloxane oligomers may also be used as a silane coupling agent usable in the present disclosure. The siloxane oligomers may be silicone resins of relatively low molecular weights of which ends of molecular chains are sealed by alkoxysilyl groups. The silane compound is preferably contained in an amount range of 0.1 parts by weight to 10 parts by weight, or 0.1 parts by weight to 5 parts by weight with respect to 100 parts by weight of the total adhesive composition. The adhesive layer may exhibit appropriate surface energy and adhesive strength in the range.

On the other hand, an active energy ray-curable adhesive used in the present disclosure may additionally include radical polymerizable monomers if necessary. The radical polymerizable monomers may be various compounds as radical curable constituents including one or more of (meth) acrylic functional groups, and examples of the radical polymerizable monomers may include (meth)acrylates, (meth)acrylamides, maleimides, (meth)acrylic acid, maleic acid, itaconic acid, (meth)acrylaldehyde, (meth)acryloyl morpholine, N-vinyl-2-pyrrolidone, triallyl isocyanurate, etc.

Specific examples of (meth)acrylates having a (meth) acryloyl group within molecules may include methyl(meth) acrylate, ethyl(meth)acrylate, propyl(meth)acrylate, isopropyl(meth)acrylate, butyl(meth)acrylate, isobutyl(meth) acrylate, 2-ethylhexyl(meth)acrylate, octyl(meth)acrylate, isooctyl(meth)acrylate, lauryl(meth)acrylate, stearyl(meth) acrylate, 2-hydroxyethyl(meth)acrylate, 2-hydroxypropyl (meth)acrylate, 4-hydroxybutyl(meth)acrylate, cyclohexyl (meth)acrylate, isobornyl(meth)acrylate, 1,4-cyclohexanedimethylolmono(meth)acrylate, dicyclopentanyl(meth)acrylate, dicyclopentenyl(meth)acrylate, dicyclopentenyloxyethyl(meth)acrylate, benzyl(meth) acrylate, phenolalkyleneoxide adduct(meth)acrylate, nonylphenolalkyleneoxide adduct(meth)acrylate, 2-methoxyethyl (meth)acrylate, ethoxyethoxyethyl(meth)acrylate, 2-ethylhexylalcohol alkyleneoxide adduct(meth)acrylate, ethyleneglycolmono(meth)acrylate, propyleneglycolmono (meth)acrylate, pentanediolmono(meth)acrylate, hexanediolmono(meth)acrylate, diethyleneglycolmono(meth)acrylate, triethyleneglycolmono(meth)acrylate, tetraethyleneglycolmono(meth)acrylate, polyethyleneglycolmono(meth)acrylate, dipropyleneglycolmono(meth) acrylate, tripropyleneglycolmono(meth)acrylate, polypropyleneglycolmono(meth)acrylate, 2-hydroxy-3-phenoxypropyl(meth)acrylate, 2-hydroxy-3-butoxypropyl (meth)acrylate, tetrahydrofurfuryl(meth)acrylate, caprolactone-modified tetrahydrofurfuryl(meth)acrylate, (2-ethyl-2-methyl-1,3-dioxolane-4-il)methyl(meth)acrylate, (2-isobutyl-2-methyl-1,3-dioxolane-4-il)methyl(meth)acrylate, (1,4-dioxaspiro[4,5]decane-2-il)methyl(meth)acrylate, glycidyl(meth)acrylate, 3,4-epoxycyclohexylmethyl(meth) acrylate, (3-ethyloxetane-3-il)methyl(meth)acrylate, 2-(meth)acryloyloxymethylisocyanate, allyl(meth)acrylate, N-(meth)acryloyloxyethylhexahydrophthalimide, N-(meth) acryloyloxyethyltetrahydrophthalimide, 2-(meth)acryloyloxyethylhexahydrophthalic acid, 2-(meth)acryloyloxyethylsuccinic acid, ω-carboxy-polycaprolactonemono(meth) acrylate, 2-(meth)acryloyloxyethyl acid phosphate, etc.

Specific examples of the (meth)acrylamides may include (meth)acrylamide, N,N-dimethyl(meth)acrylamide, N,N-diethyl(meth)acrylamide, N-methylol(meth)acrylamide, N-(3-N,N-dimethylaminopropyl)(meth)acrylamide, methylenebis (meth)acrylamide, ethylenebis(meth)acrylamide, N,N-diallyl(meth)acrylamide, etc.

Specific examples of the maleimides may include N-methylmaleimide, N-hydroxyethylmaleimide, N-hydroxyethylcitraconimide, urethane acrylate of N-hydroxyethylcitraconimide and isophorone diisocyanate, etc.

Specific examples of (meth)acrylates having two (meth) acryloyl groups within molecules may include 1,3-butanedioldi(meth)acrylate, 1,6-hexanedioldi(meth)acrylate, 1,9-nonanedioldi(meth)acrylate, 1,10-decanedioldi(meth) acrylate, 1,3-butyleneglycoldi(meth)acrylate, 2-methacryloyloxyethyl acid phosphate, ethyleneglycoldi (meth)acrylate, diethyleneglycoldi(meth)acrylate, triethyleneglycoldi(meth)acrylate, neopentylglycoldi(meth)acrylate, dipropyleneglycoldi(meth)acrylate, tripropyleneglycoldi(meth)acrylate, tetraethyleneglycoldi (meth)acrylate, cyclohexanedimethanoldi(meth)acrylate, polyethyleneglycoldi(meth)acrylate, polyethyleneglycol (200)di(meth)acrylate, polyethyleneglycol(400)di(meth) acrylate, polyethyleneglycol(600)di(meth)acrylate, glycerinedi(meth)acrylate, 2-hydroxy-3-acrylooxypropylenemethacrylate, dimethyloltricyclodecanedi(meth)acrylate, etc.

Specific examples of (meth)acrylates having three (meth) acryloyl groups within molecules may include trimethylolpropanetri(meth)acrylate, trimethylolpropanetri(meth)acrylate, trimethylolpropanetri(meth)acrylate, ditrimethylolpropanetri(meth)acrylate, trimethylpropanetri (meth)acrylate, tris(2-hydroxyethyl)isocyanurate triacrylate, tris(2-hydroxyethyl)isocyanurate, pentaerythritol triacrylate, ethoxylated trimethylol propane tri(meth)acrylate, proxylated trimethylol propane tri(meth)acrylate, etc.

Specific examples of (meth)acrylates having four or five (meth)acryloyl groups within molecules may include pentaerythritol tetra(meth)acrylate, ditrimethylol propane tetra (meth)acrylate, dipentaerythritol penta(meth)acrylate, epoxylated pentaerythritol tetra(meth)acrylate, pentaacrylate ester, etc. Specific examples of (meth)acrylates having six (meth)acryloyl groups within molecules may include dipentaerythritol hexa(meth)acrylate.

The radical polymerizable monomers may be contained in an amount of more than about 0 parts by weight to about 40 parts by weight, preferably about 5 parts by weight to about 30 parts by weight, and more preferably about 5 parts by weight to about 25 parts by weight with respect to 100 parts by weight of the total adhesive composition.

On the other hand, when the adhesive composition includes the radical polymerizable monomers, a photoradical polymerization initiator may be mixed with the adhesive composition to improve the curing rate by promoting radical polymerization of the adhesive composition. Although the photoradical polymerization initiator is not limited thereto, examples of the photoradical polymerization initiator may include acetophenone-based photopolymerization initiators, benzoin ether-based photopolymerization initiators, benzophenone-based photopolymerization initiators, thioxanthone-based photopolymerization initiators, etc. The photoradical polymerization initiator may be contained in an amount of about 0.5 parts by weight to about 20 parts by weight, preferably about 0.5 parts by weight to about 15 parts by weight, and more preferably about 0.5 parts by weight to about 10 parts by weight with respect to 100 parts by weight of the total adhesive composition.

Further, if necessary, the active energy ray-curable adhesive may additionally include a photosensitizer, an antioxidant, an oligomer and an adhesion promoter, and it is preferable for the active energy ray-curable adhesive to additionally include more than 0 parts by weight to 4 parts by weight of urethane acrylate. When the active energy ray-curable adhesive additionally includes urethane acrylate, viscosity of the active energy ray-curable adhesive tends to increase, but the active energy ray-curable adhesive is heated such that the increased viscosity of the adhesive can be lowered.

The active energy ray-curable adhesive is very excellent in terms of heat resistance since the active energy ray-curable adhesive has a glass transition temperature of 80° C. or higher, preferably 80° C. to 120° C. after curing as described above. Actually, it was found that polarizers were not broken when evaluating heat resistance durability and thermal shock properties of a polarizing plate manufactured using an adhesive composition according to the present disclosure at 80° C.

Further, since the active energy ray-curable adhesive has a low viscosity range at 25° C. of about 15 cP to about 80 cP, preferably about 15 cP to about 50 cP, the active energy ray-curable adhesive is excellent in terms of workability and exhibits excellent adhesive strength at a thin adhesion layer thickness.

Meanwhile, the adhesive layer according to the present disclosure has a thickness of about 10 μm or lower, preferably about 0.1 μm to about 5 μm. There is a problem that the polarizing plate has a creased external appearance if the adhesion layer has a thickness greater than 10 μm, and it is more desirable in terms of uniformity and adhesive strength of the adhesive layer if the adhesion layer has a thickness of 0.1 μm or more.

On the other hand, when a transparent polymer film in addition to a polyethylene terephthalate film is adhered to the other side of polarizer, the transparent polymer film and the polarizer may also be adhered by an adhesive. However, examples of the adhesive used in adhering the polarizer to films of polymers e.g., polyethylene terephthalate are not particularly limited. Examples of various adhesives used in the related art may include water-based adhesives, e.g., polyvinyl alcohol-based adhesives, radical curable adhesives, e.g., acrylic adhesives and urethane adhesives, and photo cationic adhesives, e.g., epoxy-based adhesives. When considering convenient aspects of the process, active energy ray adhesives may be used rather than the water-based adhesives. Even when using the active energy ray adhesives rather than the water-based adhesives, an active energy ray-curable adhesive of the above-described composition is not necessarily used, and appropriate adhesives may be used according to types of a polymer film used.

(4) Primer Layer

A polarizing plate according to the present disclosure includes a primer layer formed between the adhesive layer and the polyethylene terephthalate film to improve adhesive strength of an adhesive layer and a polyethylene terephthalate film.

Although the primer layer according to the present disclosure is not limited to the examples, examples of the primer layer may include films formed by a primer composition including one or more binder resins selected from the group consisting of polyester and polyvinyl alcohol-based resins and one or more crosslinking agents selected from the group consisting of acrylic crosslinking agents, epoxy-based crosslinking agents and polyvinyl alcohol-based crosslinking agents. Although the epoxy-based crosslinking agents are not limited to the examples, examples of the epoxy-based crosslinking agents may include alicyclic epoxy groups and aromatic epoxy groups.

Meanwhile, although the primer composition is not limited to the crosslinking agent when considering adhesive strength-improving effects, optical properties, etc, it is preferable that the primer composition include 0.1 parts by weight to 50 parts by weight of the crosslinking agents with respect to 100 parts by weight of the binder resins.

On the other hand, if necessary, the primer composition may additionally include constituents, e.g., wax, organic particles, inorganic particles, a defoaming agent, a thickener, a lubricating agent, and an antioxidant besides the above-mentioned constituents within ranges in which the constituents do not harm physical properties of the primer composition.

The primer composition according to the present disclosure may be prepared by a method of blending the constituents to an appropriate ratio within water and mixing or dispersing the blended materials.

Meanwhile, a primer layer formed by the primer composition preferably has a thickness of about 100 nm to about 1 μm. Adhesive strength of the primer layer decreases when the primer layer has a thickness of 100 nm or less. Blocking of films may occur to result in a fracture of the films since the primer is not properly dried during coating of a primer when the primer layer has a thickness of 1 μm or more.

Further, the surface of the primer layer according to the present disclosure has a water contact angle of preferably 40° to 100°, more preferably 50° to 90°, and further more preferably 60° to 80°. Since hydrophilicity of the primer layer is strong when the water contact angle is less than 40°, the primer layer is reacted with iodine of the polarizer to hinder the iodine arrangement such that single color scatter, and the degree of polarization may be hindered. Adhesion of the primer layer with the polarizer is difficult since hydrophobicity of the primer layer is strong when the water contact angle is more than 100°.

Meanwhile, when the transparent polymer film besides the polyethylene terephthalate film is adhered onto the other side of the polarizer, the primer layer may also be formed between the transparent polymer film and the adhesive layer. However, the primer layer may be omitted when adhesive strength of the polymer film and the adhesive layer is sufficient.

A composition for the primer layer formed between the adhesive layer and the polymer film besides the polyethylene terephthalate film is not particularly limited, and the composition for the primer layer may be properly selected according to the polymer film and the adhesive layer used. However, the primer composition may be used when considering convenience and economic efficiency of the process.

For example, the polarizing plate according to the present disclosure may be manufactured by a method of coating a primer composition on one side of a transparent polymer film to form a primer layer, coating an active energy ray-curable adhesive composition on one side of the primer layer or a polarizer to form an adhesion layer, laminating the polarizer and a transparent substrate film, and curing the adhesive composition through light radiation.

Such constructed polarizing plate according to the present disclosure not only exhibits excellent curl characteristics, but also is excellent in terms of physical properties, e.g., durability, single transmittance, polarization degree, and colors. Specifically, the polarizing plate according to the present disclosure has excellent optical properties, e.g., a single transmittance of about 40% to about 45% and a polarization degree of 99% or higher. The polarizing plate has superior water resistance since decoloration of the polarizing plate in an MD direction is less than 10 mm when dipping the polarizing plate into water having a temperature of 60° C. for 24 hours.

The polarizing plate according to the present disclosure may be usefully applied to an image display device, e.g., a liquid crystal display (LCD) or an organic electroluminescence display. For example, image display devices according to the present disclosure may be LCDs including a liquid crystal panel and polarizing plates respectively formed on both sides of the liquid crystal panel, wherein at least one of the polarizing plates may be the polarizing plate according to the present disclosure. Types of the liquid crystal panel included in the LCDs are not particularly limited. For example, although the liquid crystal panel is not limited to the types, the types of the liquid crystal panel may be all publicly known panels including: passive matrix type panels, e.g., a twisted nematic (TN) type panel, a super twisted nematic (STN) type panel, a ferroelectric (F) type panel, and a polymer dispersed (PD) type panel; active matrix type panels, e.g., a two terminal type panel and a three terminal type panel; in plane switching (IPS) type panels; and vertical alignment (VA) type panels. Further, although other components composing the LCDs are not also particularly limited to types of top and bottom substrates, e.g., a color filter substrate and an array substrate, components publicly known in the related art may be adopted without limitations.

MODE FOR INVENTION

Preparation Example 1—Adhesive A

An adhesive composition A for a polarizing plate was prepared by adding 5 parts by weight of a cationic initiator CPI 100P produced by San-Apro Ltd to 100 parts by weight of a resin composition prepared by putting 25% by weight of 2,4-epoxycyclohexylmethyl-3,4'-epoxycyclohexanecarboxylate (Celloxide 2021P produced by Daicel Chemical Industries Ltd.) of which a homopolymer had a glass transition temperature of 190° C., 25% by weight of 1,2-cyclohexane dimethanol diglycidylether of which a homopolymer had a glass transition temperature of 25° C., and 50% by weight of 3-ethyl-3-[(3-ethylolcetane-3-il)methoxymethyl]oxetane (Aron Oxetane DOX221 produced by Toa Gosei Co., Ltd.). The prepared adhesive composition A had a viscosity of 35 cP and a glass transition temperature of 102° C.

Example 1

A primer composition including a polyester resin and an epoxy-based crosslinking agent, the primer composition including 40 parts by weight of a resin composition A115GE produced by Takamatsu Corporation and obtained by blending the polyester resin with the epoxy-based crosslinking agent, 3 parts by weight of silica and 57 parts by weight of water, was coated on one side of a polyethylene terephthalate film to manufacture a polyethylene terephthalate film on which a primer layer was formed.

A corona-treated triacetyl cellulose film such as NRT film manufactured by Fuji Photo Film Co., Ltd was prepared.

Then, an adhesive A prepared by the Preparation Example 1 was coated on both sides of a polarizer, the polyethylene terephthalate film and the triacetyl cellulose film, i.e., NRT film, were laminated on the adhesive A-coated both sides of the polarizer, and the laminated materials passed through a laminator. The polyethylene terephthalate film and the triacetyl cellulose film were laminated such that a primer layer of the polyethylene terephthalate film was positioned at the adhesive layer side. Then, ultraviolet rays of 500 mJ/cm$^2$ were cast onto the adhesive layers using a UV radiation device (a metal halide lamp) to cure the adhesive layers such that a polarizing plate constructed in a structure consisting of a PET film/a primer layer/an adhesive layer/a polarizer/an adhesive layer/an NRT film was manufactured.

Comparative Example 1

A polarizing plate was manufactured by the same method as that of Example 1 except that a corona-treated triacetyl cellulose film UZTAC manufactured by Fuji Photo Film Co., Ltd instead of the primer layer-formed polyethylene terephthalate film was used. The manufactured polarizing plate was used to manufacture a polarizing plate constructed in a structure consisting of a UZ TAC film/an adhesive layer/a polarizer/an adhesive layer/an NRT film.

Comparative Example 2

A primer composition including a polyester resin and an acrylic crosslinking agent was coated on one side of a polyethylene terephthalate film such that a primer layer-formed polyethylene terephthalate film was manufactured.

A corona-treated triacetyl cellulose film NRT manufactured by Fuji Photo Film Co., Ltd was prepared.

Then, a water-based adhesive including an acetoacetyl group-modified polyvinyl alcohol-based resin and a glyoxalic acid salt as a crosslinking agent was coated on both sides of a polarizer, the polyethylene terephthalate film and the triacetyl cellulose film, i.e., NRT film, were laminated on the water-based adhesive-coated both sides of the polarizer, and the laminated materials passed through a laminator. The polyethylene terephthalate film and the triacetyl cellulose film were laminated such that a primer layer of the polyethylene terephthalate film was positioned at the adhesive layer side. Then, the adhesive layer was dried in an oven at 80° C. for 5 minutes to cure the adhesive layer such that a polarizing plate constructed in a structure consisting of a PET film/a primer layer/an adhesive layer/a polarizer/an adhesive layer/an NRT film was manufactured.

Comparative Example 3

A polarizing plate was manufactured by the same method as in the Comparative Example 2 except that a corona-treated triacetyl cellulose film UZ TAC manufactured by Fuji Photo Film Co., Ltd instead of the primer layer-formed polyethylene terephthalate film was used. The manufactured polarizing plate was used to manufacture a polarizing plate constructed in a structure consisting of a UZ TAC film/an adhesive layer/a polarizer/an adhesive layer/an NRT film.

Comparative Example 4

A polarizing plate was manufactured by the same method as that of Example 1 except that a polyethyelene terephthalate film on which a primer layer was not formed was used. The manufactured polarizing plate was constructed in a structure consisting of a PET film/an adhesive layer/a polarizer/an adhesive layer/an NRT film.

Comparative Example 5

A polarizing plate was manufactured by the same method as that of Example 1 except that a primer composition in which a polyester resin and a urethane-based crosslinking agent were added was used instead of a primer composition including a polyester resin and an epoxy-based crosslinking agent.

Comparative Example 6

A polarizing plate was manufactured by the same method as that of Example 1 except that a primer composition including a polyurethane resin was used instead of a primer composition including a polyester resin and an epoxy-based crosslinking agent.

Test Example 1—Measurement of Curl Characteristics

Curl characteristics of the polarizing plates manufactured by the Example 1 and those Comparative Examples 1 to 6 were observed by the naked eye. Photographs illustrating the curl characteristics of the polarizing plates of the Example 1 and those Comparative Examples 1 to 6 are illustrated in FIGS. 1 to 7. It can be seen through FIGS. 1 to 7 that curling occurred in the polarizing plates manufactured by those Comparative Examples 1 to 6 while curling didn't occur in the polarizing plate manufactured by the Example 1.

Test Example 2—Measurement of Water Resistance

After the polarizing plate manufactured by the Example 1 and the polarizing plates manufactured by the Comparative Example 1 were dipped into water of 60° C. for 24 hours, states of the polarizing plates were observed by the naked eye. FIG. 8 is a photograph illustrating the states of polarizing plates obtained after dipping the polarizing plates manufactured by the Example 1 and the Comparative Example 1 into water for 24 hours. It can be seen through FIG. 8 that there was hardly any change in the state of the polarizing plate of the Example 1 even after dipping the polarizing plate into water for 24 hours. On the other hand, it can be seen through FIG. 8 that decoloration of an end portion of the polarizing plate of the Comparative Example 1 began after dipping the polarizing plate into water for 4 hours, and extensive decoloration of the polarizing plate of the Comparative Example 1 occurred after dipping the polarizing plate into water for 24 hours.

Example 2

A primer composition including a polyester resin and an epoxy-based crosslinking agent, the primer composition including 40 parts by weight of a resin composition A115GE produced by Takamatsu Corporation and obtained by blending the polyester resin with the epoxy-based crosslinking agent, 3 parts by weight of silica and 57 parts by weight of water, was coated on a low refractive index layer-coated polyethylene terephthalate film to manufacture a polyethylene terephthalate film on which a primer layer was formed, wherein the low refractive index layer was formed by coating an acrylic resin mixed with 1,1,1-trifluoroethane on one side of the polyethylene terephthalate film.

Then, a poly(N-cyclohexanemaleimide-co-methylmethacrylate-co-αmethyl-styrene) resin composition was fed to a nitrogen-substituted 24φ extruder from a raw material hopper to an extruder and molten at 240° C. to prepare raw material pellets. After vacuum drying the obtained raw material pellets, the vacuum dried raw material pellets were fed to a nitrogen substituted twin extruder from the raw material hopper to the extruder, the fed raw material pellets were molten by the extruder at 260° C., the molten material passed through a coat hanger type T-die, and the molten material passing through the T-die passed through chromium plating casting rolls and drying rolls to manufacture an acrylic optical film. After holding the manufactured optical film at 135° C. for 2 minutes, the optical film was stretched as much as 100% in a MD direction and 100% in a TD direction respectively to manufacture an acrylic film.

After the manufactured acrylic film was corona-treated, 10% by weight of a primer composition prepared by diluting CK-PUD-F (Chokwang urethane dispersion) with pure water was coated on the top of the acrylic film to manufacture a urethane-based primer layer-formed acrylic film.

Then, an adhesive A prepared by the Preparation Example 1 was coated on both sides of a polarizer, the polyethylene terephthalate film and the acrylic film were laminated on the adhesive A-coated both sides of the polarizer, and the laminated materials passed through a laminator. The polyethylene terephthalate film and the acrylic film were laminated such that a primer layer of the polyethylene terephthalate film and the acrylic film was positioned at the adhesive layer side. Then, ultraviolet rays of 500 mJ/cm$^2$ were cast onto the adhesive layer using a UV radiation device (a metal halide lamp) to cure the adhesive layer such that a polarizing plate constructed in a structure consisting of a PET film/a primer layer/an adhesive layer/a polarizer/an adhesive layer/a primer layer/an acrylic film was manufactured.

Comparative Example 7

A polarizing plate was manufactured by the same method as in the Example 2 except that a corona-treated triacetyl cellulose film NRT manufactured by Fuji Photo Film Co., Ltd instead of a primer layer-formed polyethylene terephthalate film was used. The manufactured polarizing plate was constructed in a structure consisting of an NRT film/an adhesive layer/a polarizer/an adhesive layer/a primer layer/an acrylic film.

Test Example 3—Measurement of Optical Properties

Optical properties and colors (color values according to CIE color coordinate system) of the polarizing plates manufactured by the Example 2 and the Comparative Example 7 were measured using a JASCO-V-7100 spectrophotometer. The measurement results are the same as those disclosed in the following Table 1.

TABLE 1

| Classification | Ts (%) | single a | single b | DOP (degree of polarization) | x | y | Orthogonal b |
|---|---|---|---|---|---|---|---|
| Comparative Example 7 | 42.69 | −1.53 | 3.47 | 99.9946 | 0.196 | 0.115 | −0.92 |
| Example 2 | 43.05 | −1.68 | 3.84 | 99.9951 | 0.217 | 0.148 | −0.57 |

As illustrated in the Table 1, it could be confirmed that not only an equal level of the degree of polarization was shown, but also the single transmittance was improved when comparing the Example 2 including a low refractive index layer-formed PET film with the Comparative Example 7. Further, it could be confirmed that color characteristics of the Example 2 were also excellent since the Example 2 had single color values a and b and an orthogonal color b value which were larger than those of Comparative Example 7 such that the polarizing plate of the Example 2 had a less bluish color compared to that of the Comparative Example 7.

Test Example 4—Measurement of Heat Resistance

After the polarizing plates manufactured by the Example 2 and the Comparative Example 7 were put into an oven at 80° C. for 100 hours, the heated polarizing plates were left alone at room temperature for 12 hours, and optical properties and color variations of the polarizing plates were measured. Measurement results were written in the following Table 2.

TABLE 2

| Classification | ΔTs (%) | Δsingle a | Δsingle b | ΔDOP (degree of polarization) | Δx | Δy | ΔOrthogonal b |
|---|---|---|---|---|---|---|---|
| Comparative Example 7 | 0.26 | −0.16 | 1.25 | −0.0016 | 0.049 | 0.095 | 0.73 |
| Example 2 | 0.13 | −0.19 | 1.25 | −0.0019 | 0.047 | 0.092 | 0.48 |

As illustrated in the Table 2, it can be seen that the polarizing plate of the Example 2 is more excellent in terms of heat resistance than that of the Comparative Example 7 since the polarizing plate of the Example 2 has a single transmittance variation and an orthogonal color value b variation that are far less than that of the Comparative Example 7 under high temperature conditions.

The invention claimed is:

1. A polarizing plate comprising an adhesive layer, a primer layer, and a polyethylene terephthalate film which are sequentially formed on at least one side of a polarizer,
   wherein the adhesive layer is formed by an active energy ray-curable adhesive comprising a first epoxy compound of which a homopolymer has a glass transition temperature of 120° C. to 200° C., a second epoxy compound of which a homopolymer has a glass transition temperature of 0° C. to 60° C., and a cationic photopolymerization initiator,
   wherein the primer layer is formed by a primer composition comprising one or more binder resins selected from the group consisting of polyester and polyvinyl alcohol resins, and one or more cross-linking agents selected from the group consisting of acrylic cross-linking agents, epoxy-based cross-linking agents, and polyvinyl alcohol-based cross-linking agents,
   wherein the polyethylene terephthalate film further comprises a low refractive index layer with a refractive index of 1.4 to 1.5 formed on one side thereof directly contacting the primer layer, or both sides thereof,
   wherein the polyethylene terephthalate film having the low refractive index layer has a total refractive index of 1.48 to 1.55,
   wherein the polyethylene terephthalate film has a water vapor transmission rate of 100 g/m$^2$*day or less and a moisture content of 1% by weight or less, and
   wherein a surface of the primer layer has a water contact angle of 40° to 100°.

2. The polarizing plate of claim 1, wherein the active energy ray-curable adhesive comprises 100 parts by weight of the first epoxy compound, 30 parts by weight to 100 parts by weight of the second epoxy compound, and 0.5 parts by weight to 20 parts by weight of the cationic photopolymerization initiator.

3. The polarizing plate of claim 1, wherein the first epoxy compound comprises one or more selected from the group consisting of an alicyclic epoxy compound and an aromatic epoxy compound.

4. The polarizing plate of claim 3, wherein the first epoxy compound comprises one or more selected from the group consisting of 3,4-epoxycyclohexylmethyl-3,4'-epoxycyclohexanecarboxylate, vinyl cyclohexane dioxide, dicyclopentadiene dioxide, bis(epoxycyclopentyl) ether, bisphenol A-based epoxy compounds, and bisphenol F-based epoxy compounds.

5. The polarizing plate of claim 1, wherein the second epoxy compound comprises one or more selected from the group consisting of alicyclic epoxy compounds and aromatic epoxy compounds.

6. The polarizing plate of claim 5, wherein the second epoxy compound comprises one or more of glycidyl ether groups.

7. The polarizing plate of claim 6, wherein the second epoxy compound comprises one or more selected from the group consisting of 1,4-cyclohexanedimethanoldiglycidyl ether, 1,4-butanedioldiglycidyl ether, 1,6-hexanedioldiglycidyl ether, neopentyldiglycidyl ether, resorcinol diglycidyl ether, diethylene glycol diglycidyl ether, ethylene glycol diglycidyl ether, trimethylolpropane triglycidyl ether, n-butyl glycidyl ether, 2-ethylhexyl glycidyl ether, phenyl glycidyl ether, and o-cresyl glycidyl ether.

8. The polarizing plate of claim 1, wherein the active energy ray-curable adhesive comprises the first epoxy compound and the second epoxy compound at a weight ratio of 1:1 to 3:1.

9. The polarizing plate of claim 2, wherein the active energy ray-curable adhesive further comprises 100 parts by weight to 400 parts by weight of an oxetane compound having at least one oxetanyl group within molecules thereof.

10. The polarizing plate of claim 1, wherein the active energy ray-curable adhesive further comprises a vinyl-based compound, and the vinyl-based compound is contained in an amount of 0.1 parts by weight to 10 parts by weight with respect to 100 parts by weight of the total adhesive.

11. The polarizing plate of claim 10, wherein the vinyl-based compound comprises at least one selected from the group consisting of hydroxy $C_{1-6}$ alkylvinylether and vinyl acetate.

12. The polarizing plate of claim 1, wherein the active energy ray-curable adhesive further comprises a silane coupling agent, and the silane coupling agent is contained in an amount range of 0.1 parts by weight to 5 parts by weight with respect to 100 parts by weight of the total adhesive.

13. The polarizing plate of claim 12, wherein the silane coupling agent comprises one or more cationic polymerizable functional groups selected from the groups consisting of an epoxy group, a vinyl group, a radical group, and combinations thereof.

14. The polarizing plate of claim 1, wherein the active energy ray-curable adhesive further comprises radical polymerizable monomers, and the radical polymerizable monomers are contained in an amount greater than 0 parts by weight to 40 parts by weight with respect to 100 parts by weight of the total adhesive.

15. The polarizing plate of claim 14, wherein the active energy ray-curable adhesive further comprises a photoradical polymerization initiator, and the photoradical polymerization initiator is contained in an amount of 0.5 parts by weight to 20 parts by weight with respect to 100 parts by weight of the total adhesive.

16. The polarizing plate of claim 1, wherein the active energy ray-curable adhesive has a glass transition temperature of 80° C. to 120° C.

17. The polarizing plate of claim 1, wherein the active energy ray-curable adhesive has a viscosity of 15 cP to 50 cP at 25° C.

18. The polarizing plate of claim 1, wherein the polyethylene terephthalate film is disposed on one side of the polarizer, and a transparent polymer film selected from the group consisting of a triacetyl cellulose film, a cycloolefin polymer film, a polyester-based film, a polycarbonate film, and an acrylic film is disposed on the other side of the polarizer.

19. The polarizing plate of claim 18, wherein the transparent polymer film adhered to the other side of the polarizer is a uniaxially or biaxially oriented film having a phase difference.

20. An image display device comprising the polarizing plate of claim 1.

21. The image display device of claim 20, wherein the image display device is a liquid crystal display (LCD) or an organic electroluminescence display.

* * * * *